US011216465B2

(12) United States Patent
Oberoi et al.

(10) Patent No.: US 11,216,465 B2
(45) Date of Patent: Jan. 4, 2022

(54) METHOD AND SYSTEM FOR DISPLAYING DATA REPRESENTATIVE OF A LARGE DATASET

(71) Applicant: 1QB INFORMATION TECHNOLOGIES INC., Vancouver (CA)

(72) Inventors: Jaspreet Oberoi, Coquitlam (CA); Austin Wallace, Vancouver (CA)

(73) Assignee: 1QB Information Technologies Inc., Vancouver (CA)

(*) Notice: Subject to any disclaimer, the term of this patent is extended or adjusted under 35 U.S.C. 154(b) by 520 days.

(21) Appl. No.: 15/724,881

(22) Filed: Oct. 4, 2017

(65) Prior Publication Data

US 2018/0101575 A1 Apr. 12, 2018

Related U.S. Application Data

(60) Provisional application No. 62/405,415, filed on Oct. 7, 2016.

(51) Int. Cl.
*G06F 16/24* (2019.01)
*G06F 16/2455* (2019.01)
(Continued)

(52) U.S. Cl.
CPC .... *G06F 16/24561* (2019.01); *G06F 16/2219* (2019.01); *G06F 16/26* (2019.01)

(58) Field of Classification Search
CPC .. G06F 16/337; G06F 16/9535; G06F 16/583; G06F 16/285; G06F 16/35; G06F 16/2264; G06F 16/358
See application file for complete search history.

(56) References Cited

U.S. PATENT DOCUMENTS

| 2003/0009470 A1* | 1/2003 | Leary | G06K 9/6218 |
| 2009/0121215 A1* | 5/2009 | Choi | G06N 10/00 257/31 |
| 2011/0246409 A1* | 10/2011 | Mitra | G06F 17/18 706/52 |

OTHER PUBLICATIONS

Laurens Van der Maaten "Visualizing Data using t-SNE" copy 2008 Laurens Van der Maaten and Geoffrey Hinton.*

(Continued)

*Primary Examiner* — Apu M Mofiz
*Assistant Examiner* — Cindy Nguyen
(74) *Attorney, Agent, or Firm* — Pearl Cohen Zedek Latzer Baratz LLP

(57) ABSTRACT

A method and a system are disclosed for displaying data representative of a large dataset. The method comprises the use of a processing device for receiving the dataset comprising a plurality of data points of dimension m; reducing the dimension m of at least one data point of the plurality of data points to a dimension selected from a group consisting of two (2) and three (3) if the dimension of the at least one data point is greater than or equal to three (3); generating at least one data cluster, each data cluster comprising a given number of data points; determining a set of representative data points for each generated at least one data cluster, each representative data point of a given set for representing a region of a corresponding given data cluster comprising a plurality of adjacent data points and displaying in a user interface the determined at least one set of representative data points of the at least one corresponding generated data cluster.

22 Claims, 11 Drawing Sheets

(51) Int. Cl.
G06F 16/22 (2019.01)
G06F 16/26 (2019.01)

(56) References Cited

OTHER PUBLICATIONS

Cluster Analysis : Basis Concepts and Algorithms, published May 13, 2005.*
H. Selim et al., "Statistical Modeling and Scalable, Interactive Visualization of Large Scale Big data Networks," ASE BigData/SocialCom/CyberSecurity Conference, Stanford University, May 27, 31, 2014.
M. Malinen et al., "Balanced k-means for clustering, structural, syntactic, and statistical pattern recognition," vol. 8621 of the series Lecture Notes in Computer Science, pp. 32 41, 2014.
"Fujitsu and 1QBit Collaborate on Quantum Inspired AI Cloud Service" http://www.fujitsu.com/global/about/resources/news/press-releases/2017/0516-03.html.

* cited by examiner

METHOD AND SYSTEM FOR DISPLAYING DATA REPRESENTATIVE OF A LARGE DATASET

CROSS-REFERENCE TO RELATED APPLICATION

The present patent application claims priority on U.S. Provisional Patent Application No. 62/405,415, filed on Oct. 7, 2016.

FIELD OF THE INVENTION

The invention relates to data processing. More precisely, the invention pertains to a system and method for displaying data representative of a large dataset.

BACKGROUND OF THE INVENTION

The worldwide explosion of data collection has provided an advantage to entities that are able to ask the right questions of their data and use the answers found therein. Given all this data, multi-dimensional and plentiful, it is rarely obvious how to make best use of it. The human eye is excellent at perceiving patterns, outliers and meaning in data, but only when it is in two or three dimensions. Even in two dimensions, patterns may be difficult to perceive when the data is densely laid out in an unorganized fashion, as is the case in most practical datasets with at least tens or hundreds of thousands of points.

It will be appreciated that effective data visualization can help an analyst understand how the data is distributed with respect to different data features and provide him/her with valuable leads for further analysis (See H. Selim et al.—Statistical Modeling and Scalable, Interactive Visualization of Large Scale Big data Networks, ASE BigData/SocialCom/CyberSecurity Conference, Standford University, May 27-31, 2014). However this is cumbersome with very large or complex datasets.

There is a need for a method and a system for assisting a user to visualize this kind of data, referred to as big data.

Features of the invention will be apparent from review of the disclosure, drawings and description of the invention below.

BRIEF SUMMARY OF THE INVENTION

According to a broad aspect, there is disclosed a computer-implemented method of displaying data representative of a large dataset, the method comprising use of a processing device for receiving the dataset comprising a plurality of data points of dimension m; reducing the dimension m of at least one data point of the plurality of data points to a dimension selected from a group consisting of two (2) and three (3) if the dimension of the least one data point is greater than or equal to three (3); generating at least one data cluster, each data cluster comprising a given number of data points; determining a set of representative data points for each generated at least one data cluster, each representative data point of a given set for representing a region of a corresponding given data cluster comprising a plurality of adjacent data points and displaying in a user interface the at least one determined set of representative data points of the at least one corresponding generated data cluster.

In accordance with an embodiment, the dataset is received from a remote processing unit operatively coupled to the processing device.

In accordance with an embodiment, the dataset is received from a memory located in the processing device.

In accordance with an embodiment, the dataset is a dataset of n images, wherein each image is represented by a vector having the dimension m, wherein each pixel is represented by a given coordinate of the vector.

In accordance with an embodiment, the dataset is a dataset representative of words.

In accordance with an embodiment, the reducing of the dimension m of at least one data point of the plurality of data points to a dimension selected from a group consisting of two (2) and three (3) is performed using a technique selected from a group consisting of t-distributed stochastic neighbor embedding (t-SNE), Principal component analysis (PCA), Sammon mapping and Isomap.

In accordance with an embodiment, more than one data cluster is generated; wherein the method further comprises combining in the user interface at least two sets of representative data points from at least two corresponding data clusters; and wherein the displaying in the user interface of the at least one set of representative data point of at least one corresponding data cluster comprises displaying the user interface comprising the combined at least two sets of representative data points from at least two corresponding data clusters.

In accordance with an embodiment, the determining of a set of representative data points for each data cluster is performed using a dedicated processing unit.

In accordance with an embodiment, each set of representative data points of each data cluster is combined in the user interface.

In accordance with an embodiment, each data point is characterized by coordinates in the dimension selected, further wherein the generating of a plurality of data clusters, each data cluster comprising a given number of data points comprises dividing a space comprising the plurality of data points into two data clusters using a first axis characterized by a coordinate in a first direction, wherein the dividing comprises computing a median value of the coordinates of the plurality of data points in the first direction and wherein the coordinate in the first direction of the first axis is equal to the computed median value; and partitioning iteratively each data cluster into two partitions, wherein the partitioning of a given data cluster comprising a given number of data points having corresponding given coordinates is performed using a corresponding given axis having a corresponding given coordinate in a corresponding given direction, wherein the partitioning of the given data cluster comprises computing a corresponding median value of the corresponding given coordinates of the data points located in the given data cluster in the corresponding given direction and wherein the coordinate in the corresponding given direction of the given axis is equal to the computed corresponding median value, further wherein the corresponding given direction is alternating between a number of directions equal to the reduced dimension to thereby provide the plurality of generated data clusters.

In accordance with an embodiment, the partitioning is performed iteratively until a criterion is met.

In accordance with an embodiment, the criterion comprises a number of data points located in each of the plurality of generated data clusters.

In accordance with an embodiment, the determining of a set of representative data points for each data cluster, comprises for each given data cluster: until no data point is available in the given data cluster: generating a zone around each data point in the given data cluster, wherein the size of the generated zone is defined using a nearness index; assigning a weight to each data point in the given data cluster, wherein the assigned weight is representative of a number of data points located in the corresponding zone of each data point; selecting a data point having a largest weight assigned; updating the coordinates of the selected data point having the largest weight assigned with a weighted mean of coordinates of data points located inside its corresponding zone to form a representative data point; and removing the representative data point, the selected data point and data points located in a corresponding zone of the selected data point having the largest weight assigned and providing at least one corresponding representative data point for each data cluster.

In accordance with an embodiment, the assigning of the weight to each data point is representative of a number of data points located in the corresponding zone of each data point in the given data cluster.

In accordance with an embodiment, the determining of a set of representative data points for each data cluster, comprises for each given data cluster: generating a zone around each data point of the given data cluster, wherein the size of the generated zone is defined using a nearness index; generating a minimum set cover problem, wherein a set is defined as a collection of data points of the given data cluster that are located in a corresponding zone of a candidate data point; formulating the minimum set cover problem as a quadratic unconstrained binary optimization polynomial; providing the quadratic unconstrained binary optimization polynomial to a solver; obtaining a minimum set cover solution from the solver; translating the obtained minimum set cover solution to provide at least one representative data point for the given data cluster.

In accordance with an embodiment, the solver is one of a quantum oracle and a quadratic unconstrained binary optimization solver.

In accordance with an embodiment, the displaying in a user interface of the at least one determined set of representative data points of the at least one corresponding generated data cluster comprises storing the at least one determined set of representative data points of the at least one corresponding generated data cluster.

In accordance with an embodiment, the displaying in a user interface of the at least one determined set of representative data points of the at least one corresponding generated data cluster comprises transmitting the at least one determined set of representative data points of the at least one corresponding generated data cluster to a remote processing unit operatively connected with the processing device and further wherein the displaying is performed on the remote processing unit.

In accordance with a broad aspect, there is disclosed a digital computer for displaying data representative of a large dataset, the digital computer comprising a central processing unit; a display device; a communication port; a memory unit comprising an application for displaying data representative of a large dataset, the application comprising instructions for receiving the dataset comprising a plurality of data points of dimension m; instructions for reducing the dimension m of at least one data point of the plurality of data points to a dimension selected from a group consisting of two (2) and three (3) if the dimension m of the at least one data point is greater than or equal to three (3); instructions for generating at least one data cluster, each data cluster comprising a given number of data points; instructions for determining a set of representative data points for each generated at least one data cluster, each representative data point of a given set for representing a region of a corresponding given data cluster comprising a plurality of adjacent data points; instructions for displaying in a user interface the determined at least one set of representative data points of the at least one corresponding generated data cluster; and a data bus for interconnecting the central processing unit, the display device, the communication port and the memory unit.

In accordance with a broad aspect, there is disclosed a digital computer for displaying data representative of a large dataset, the digital computer comprising more than one central processing unit; a display device; a communication port; a memory unit comprising an application for displaying data representative of a large dataset, the application comprising instructions for receiving the dataset comprising a plurality of data points of dimension m; instructions for reducing the dimension m of at least one data point of the plurality of data points to a dimension selected from a group consisting of two (2) and three (3) if the dimension m of the at least one data point is greater than or equal to three (3); instructions for generating more than one data cluster, each data cluster comprising a given number of data points; instructions for determining a set of representative data points for each generated more than one data cluster, each representative data point of a given set for representing a region of a corresponding given data cluster comprising a plurality of adjacent data points; wherein the generating is performed for each given data cluster by a corresponding given central processing unit; instructions for displaying in a user interface the determined at least one set of representative data points of the at least one corresponding generated data cluster; and a data bus for interconnecting the central processing unit, the display device, the communication port and the memory unit.

In accordance with a broad aspect, there is disclosed a non-transitory computer-readable storage medium for storing computer-executable instructions which, when executed, cause a digital computer to perform a method for displaying data representative of a large dataset, the method comprising receiving the dataset comprising a plurality of data points of dimension m; reducing the dimension m of at least one data point of the plurality of data points to a dimension selected from a group consisting of two (2) and three (3) if the dimension m of the at least one data point is greater than or equal to three (3); generating at least one data cluster, each data cluster comprising a given number of data points; determining a set of representative data points for each generated at least one data cluster, each representative data point of a given set for representing a region of a corresponding given data cluster comprising a plurality of adjacent data points and displaying in a user interface the determined at least one set of representative data points of the at least one corresponding generated data cluster.

In accordance with a broad aspect, there is disclosed a computer-implemented method of displaying data representative of a large dataset, the method comprising use of a processing device for receiving the dataset comprising a plurality of data points of dimension m; reducing the dimension m of at least one data point of the plurality of data points to a dimension selected from a group consisting of two (2) and three (3) if the dimension of the least one data point is greater than or equal to three (3); generating at least one data cluster, each data cluster comprising a given number of data points; determining a set of representative data points for each generated at least one data cluster, each representative data point of a given set for representing a region of a corresponding given data cluster comprising a plurality of adjacent data points; and generating a user interface to be displayed to a user, the user interface generated comprising the at least one determined set of representative data points of the at least one corresponding generated data cluster.

A first advantage of the method disclosed herein is that it enables a user to have access to a limited amount of data by reducing the data size to a level at which the data can be clearly viewed and analyzed by the user.

Another advantage of the method disclosed herein is that the method disclosed herein may further help a user to readily recognize and understand patterns of data that can often be hidden due to the amount of data provided.

Another advantage of the method disclosed herein is that it may be implemented using parallel processing.

Another advantage of the method disclosed herein is that it may be implemented using a plurality of processors that do not have the capacity to work on very big datasets since the initial dataset may be divided into a plurality of data clusters and each data cluster is handled by a single of these processors.

Another advantage of the method disclosed is that it maintains the integrity of data to a considerable condensed level. That is, the coarsening provided by the method disclosed herein maintains the data distribution such that the clustering on the original dataset vs on the coarsened dataset gives comparable results (that is, very little loss of information).

BRIEF DESCRIPTION OF THE DRAWINGS

In order that the invention may be readily understood, embodiments of the invention are illustrated by way of example in the accompanying drawings.

Figure 1:
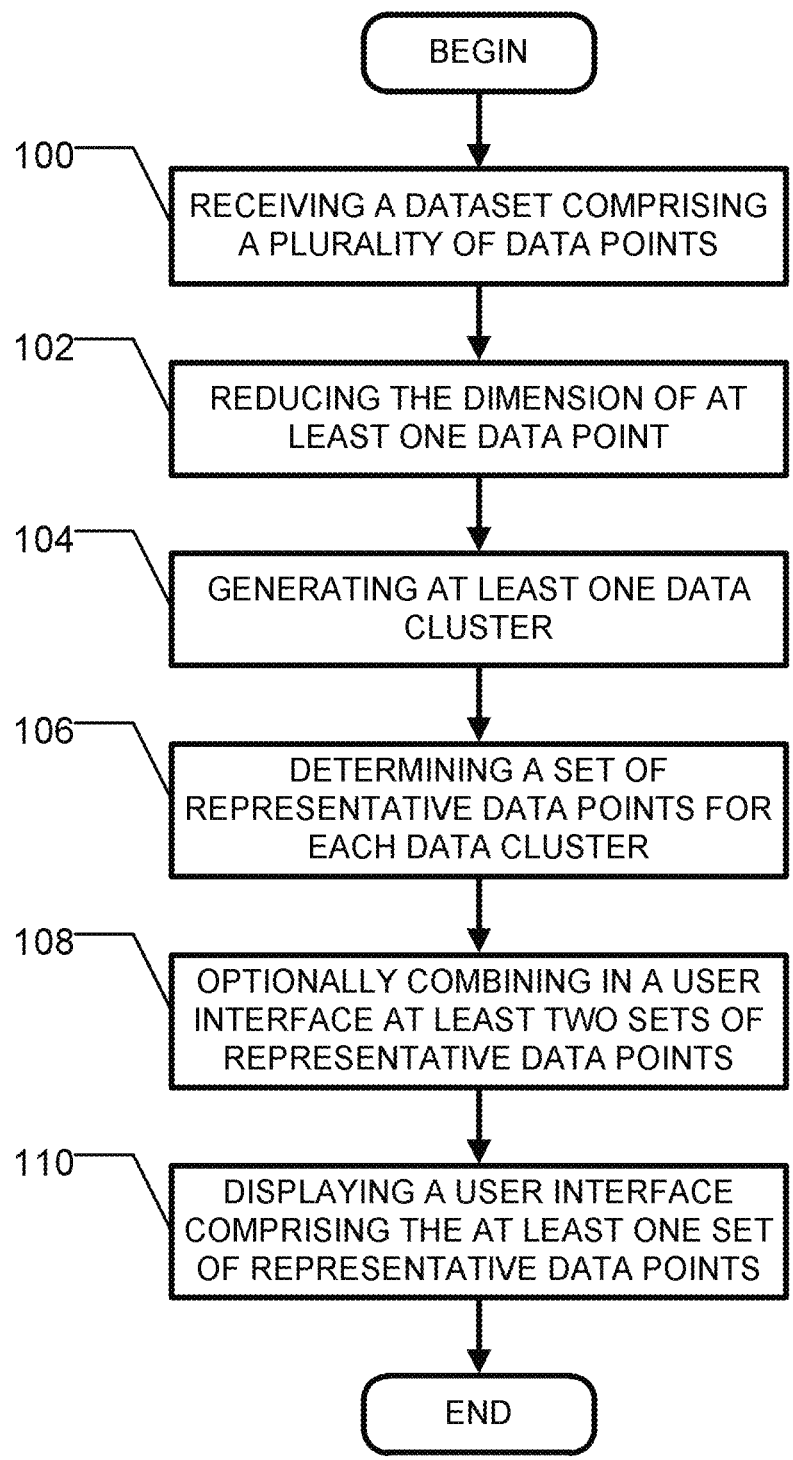
FIG. 1 is a flowchart which shows an embodiment of a method for displaying data representative of a large dataset.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

Terms

The term "invention" and the like mean "the one or more inventions disclosed in this application" unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data" and other things besides "instructions" and "a data structure" can be "data."

The term "i.e." and like terms mean "that is" and thus limit the terms or phrases they explain.

The term "dataset" means a group of at least one data point. A data point can be referred to as a vector of a given size m. The given size m is referred to as a dimension. The dataset comprises n data points. The number n therefore refers to the size of the dataset.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to a system, a method, a use thereof and a computer-readable medium for storing instructions for displaying data representative of a large dataset.

It will be appreciated that the displaying of the data representative of a large dataset may be performed using a digital computer.

Figure 2:
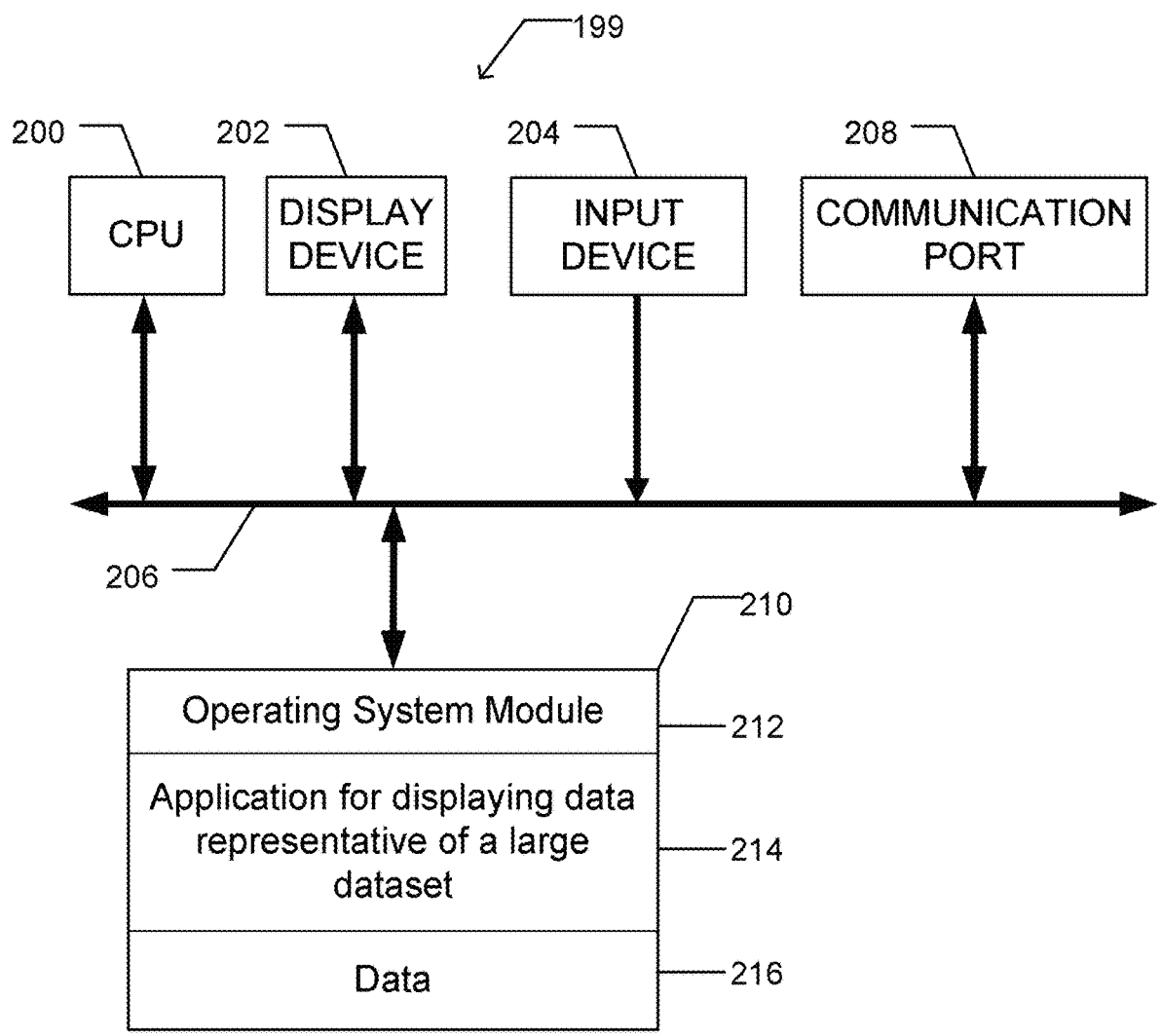
FIG. 2 is a diagram which shows an embodiment of a digital computer used for displaying data representative of a large dataset.

Now referring to FIG. 2, there is shown an embodiment of a digital computer 199 which may be used for displaying data representative of a large dataset.

In fact, it will be appreciated by the skilled addressee that the digital computer 199 may be any type of computer.

In one embodiment, the digital computer 199 is selected from a group consisting of desktop computers, laptop computers, tablet PCs, servers, smartphones, etc.

Now referring to FIG. 2, there is shown an embodiment of a digital computer 199. It will be appreciated that the digital computer 199 may also be broadly referred to as a processing device.

In this embodiment, the digital computer 199 comprises a central processing unit (CPU) 200, also referred to as a microprocessor or a processor, a display device 202, input devices 204, communication ports 208, a data bus 206 and a memory unit 210.

The central processing unit 200 is used for processing computer instructions. The skilled addressee will appreciate that various embodiments of the central processing unit 200 may be provided.

In one embodiment, the central processing unit 200 is a CPU Core i5-3210M running at 2.5 GHz and manufactured by Intel™.

The display device 202 is used for displaying data to a user. The skilled addressee will appreciate that various types of display device 202 may be used.

In one embodiment, the display device 202 is a standard liquid-crystal display (LCD) monitor.

The communication ports 208 are used for sharing data with the digital computer 199.

The communication ports 208 may comprise, for instance, a universal serial bus (USB) port for connecting a keyboard and a mouse to the digital computer 199.

The communication ports 208 may further comprise a data network communication port, such as an IEEE 802.3 port, for enabling a connection of the digital computer 199 with another computer via a data network.

The skilled addressee will appreciate that various alternative embodiments of the communication ports 208 may be provided.

In one embodiment, the communication ports 208 comprise an Ethernet port.

The memory unit 210 is used for storing computer-executable instructions.

It will be appreciated that the memory unit 210 comprises, in one embodiment, an operating system module 212.

It will be appreciated by the skilled addressee that the operating system module 212 may be of various types.

In an embodiment, the operating system module 212 is OS X Yosemite (Version 10.10.5) manufactured by Apple™.

The memory unit 210 further comprises an application for displaying data representative of a large dataset 214.

Now referring to FIG. 1, there is shown an embodiment of the method for displaying data representative of a large dataset. It will be appreciated that the method disclosed is a computer-implemented method.

According to processing step 100, a dataset comprising a plurality of data points is received.

It will be appreciated that the plurality of data points has a dimension m. It will be appreciated that in one embodiment, the dimension m is less than three (3). In an alternative embodiment, the dimension is greater than or equal to three (3).

Moreover, it will be appreciated that the dataset comprising a plurality of data points may be received according to various embodiments.

In one embodiment, the dataset comprising a plurality of data points is received from a remote processing unit operatively connected to the digital computer 199 via the communication port 208 of the digital computer 199.

In an alternative embodiment, the dataset comprising a plurality of data points is retrieved from the memory unit 210 of the digital computer 199.

It will be appreciated that the dataset comprising a plurality of data points may have various formats. In fact, it will be appreciated that the data can be qualitative (categorical) or quantitative or a mixture of both. Even a dataset with just English words for example can be encoded as a quantitative dataset using well known techniques such as term frequency-inverse document frequency (TF-IDF) vectorization. In one embodiment, the dataset comprising a plurality of data points is a dataset of images. Each image is represented as a vector of real numbers with dimension m where each dimension represents a particular pixel value.

According to processing step 102, the dimension of at least one data point is reduced to a dimension selected from a group consisting of two (2) and three (3) if the dimension of the at least one data point is greater than or equal to three (3).

The purpose of reducing the dimension of the plurality of data points is to facilitate the visualization by a user later on. As a matter of fact, the skilled addressee will appreciate that a dimension of two (2) will enable a visualization in 2D while a dimension of three (3) will enable a visualization in 3D.

It will be appreciated that the dimension of the data points may be reduced according to various techniques. In one embodiment, the data points are reduced using a technique selected from a group consisting of but not limited to t-distributed stochastic neighbor embedding (t-SNE), principal component analysis (PCA), Sammon mapping, and Isomap.

The skilled addressee will appreciate that following the reducing of the dimension of the data points, the data points may be plotted in an x-y plane or in an x-y-z space depending on the fact that the dimension is two (2) or three (3).

According to processing step 104, at least one data cluster is generated. Each data cluster comprises a portion of the data points of the plurality of data points.

In one embodiment, a plurality of data clusters is generated.

It will therefore be appreciated that the purpose of generating the plurality of data clusters is to reduce the time required for processing the data by processing smaller set of data points in a given data cluster rather than the full dataset.

It will be appreciated that the process of generating a plurality of data clusters can be inferred as finding the 'balanced distance-based' clusters which is an NP-Hard problem and solving this problem optimally for big data is practically impossible with known prior-art methods and technology. With advanced heuristics (see M. Malinen et al. Balanced k-means for clustering, structural, syntactic, and statistical pattern recognition vol. 8621 of the series lecture notes in computer science pp 32-41, 2014), a balanced clustering problem of size 5000 may be solved in several hours.

While in one embodiment each of the generated data clusters is later on processed by a processor such as the central processing unit 200 of the digital computer 199, a dedicated central processing unit may be assigned to each generated data cluster in an alternative embodiment. The skilled addressee will appreciate that, in such embodiment, the number of data clusters generated is equal to the number of dedicated central processing units available.

It will be appreciated that the generation of the plurality of data clusters may be performed according to various embodiments.

In the following, an example is provided for the case where the dimension of the data points is 2. The skilled addressee will appreciate that the method disclosed herein may be easily adapted for handling the case where the dimension of the data points is 3.

Figure 6:
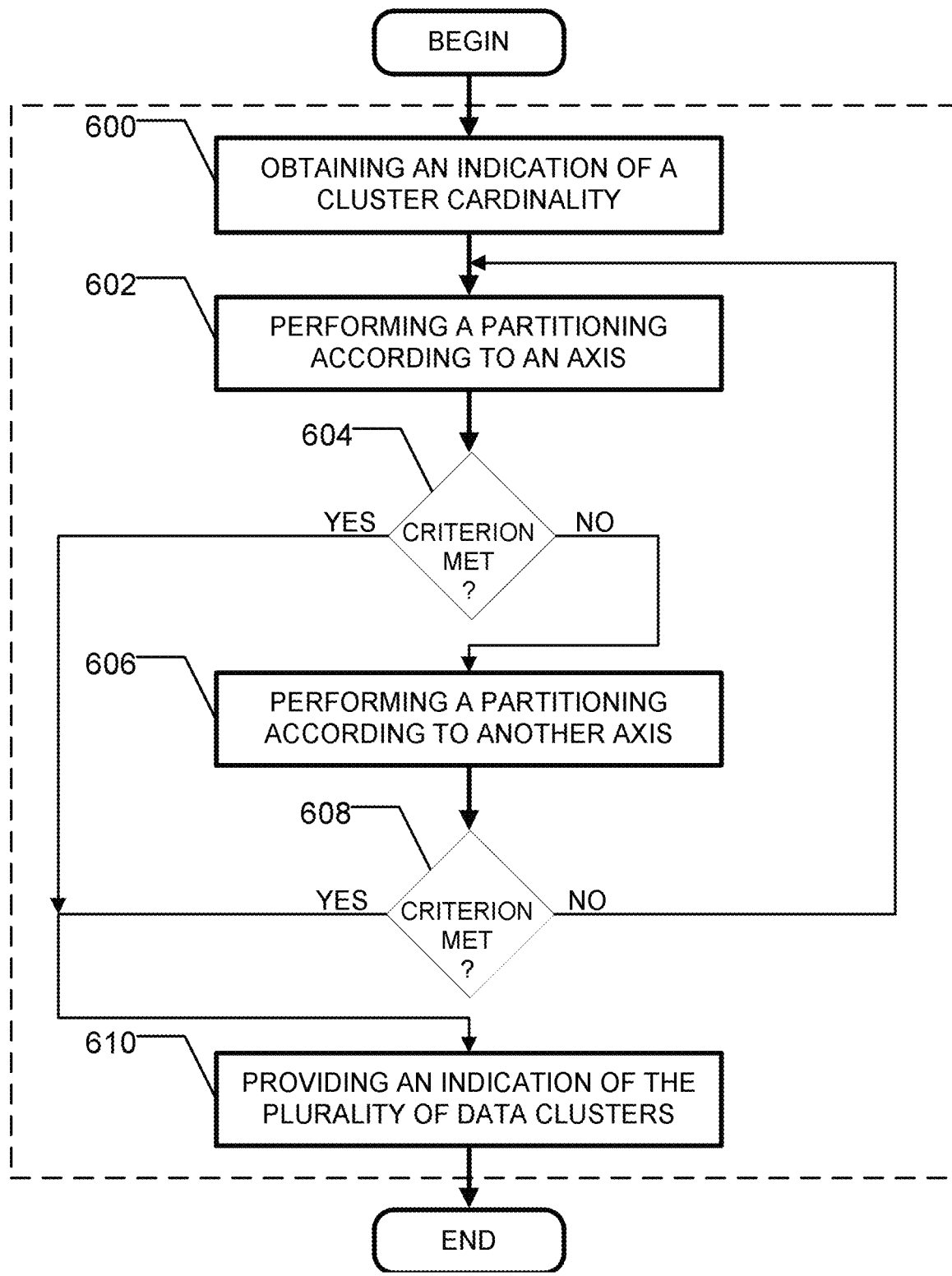
FIG. 6 is a flowchart which shows an embodiment of a method for generating a plurality of data clusters.

Now referring to FIG. 6, there is shown how the generation of a plurality of data clusters is performed.

According to processing step 600, an indication of an intended data cluster cardinality is obtained. It will be appreciated that the data cluster cardinality refers to the number of data points located in the data cluster.

It will be appreciated that the indication of an intended data cluster cardinality may be provided according to various embodiments. In one embodiment, the indication of an intended data cluster cardinality is provided by the user interacting with the digital computer 199. In an alternative embodiment, the indication of an intended data cluster cardinality is obtained from the memory unit 210. In an alternative embodiment, the indication of an intended data cluster cardinality is obtained from a remote processing unit operatively connected with the digital computer 199. The remote processing unit may be connected with the digital computer 199 via a data network. The data network may be selected from a group consisting of local area network, metropolitan area network and wide area network. In one embodiment, the data network comprises the Internet.

According to processing step 602, a partitioning is performed according to a first given axis.

It will be appreciated that the partitioning may be performed according to various embodiments.

In one embodiment the partitioning is performed by taking the median value of the plurality of data points according to the first given axis.

Figure 3A:
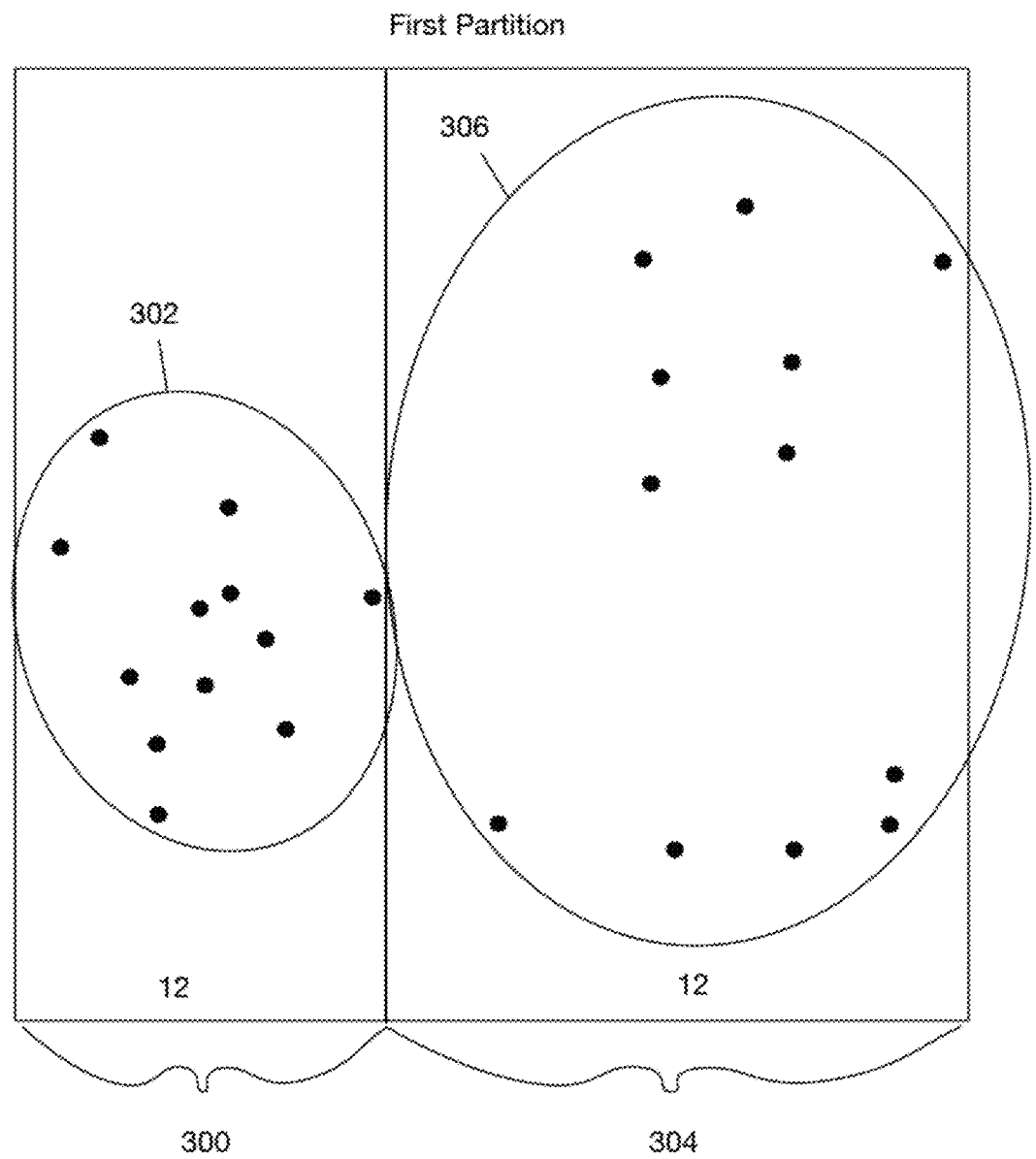
FIG. 3A is a diagram which illustrates a first partitioning used for creating a plurality of data clusters.

Now referring to FIG. 3a, there is shown an example in which the plurality of data points comprising 24 points is divided into a first data cluster having a width 300 and comprising a first set of twelve (12) data points 302 and a second data cluster having a width 304 and comprising a second set of twelve (12) data points 306. It will be appreciated that the first width 300 and the second width 304 are determined by computing the median value in the x coordinates of all the data points.

According to processing step 604, a test is performed in order to find out if at least one criterion is met.

In one embodiment, the at least one criterion comprises data cluster cardinality. More precisely, the test comprises determining if the current data cluster cardinality matches the intended cardinality. The current data cluster cardinality refers to a number of data points currently present in a given data cluster.

In the case where the at least one criterion is not met and according to processing step 606, a further partitioning is performed according to a second given axis. It will be appreciated that the second given axis is different than the first axis.

In one embodiment the partitioning is performed by taking the median value of the plurality of data points located in that data cluster according to the first given axis.

Figure 3B:
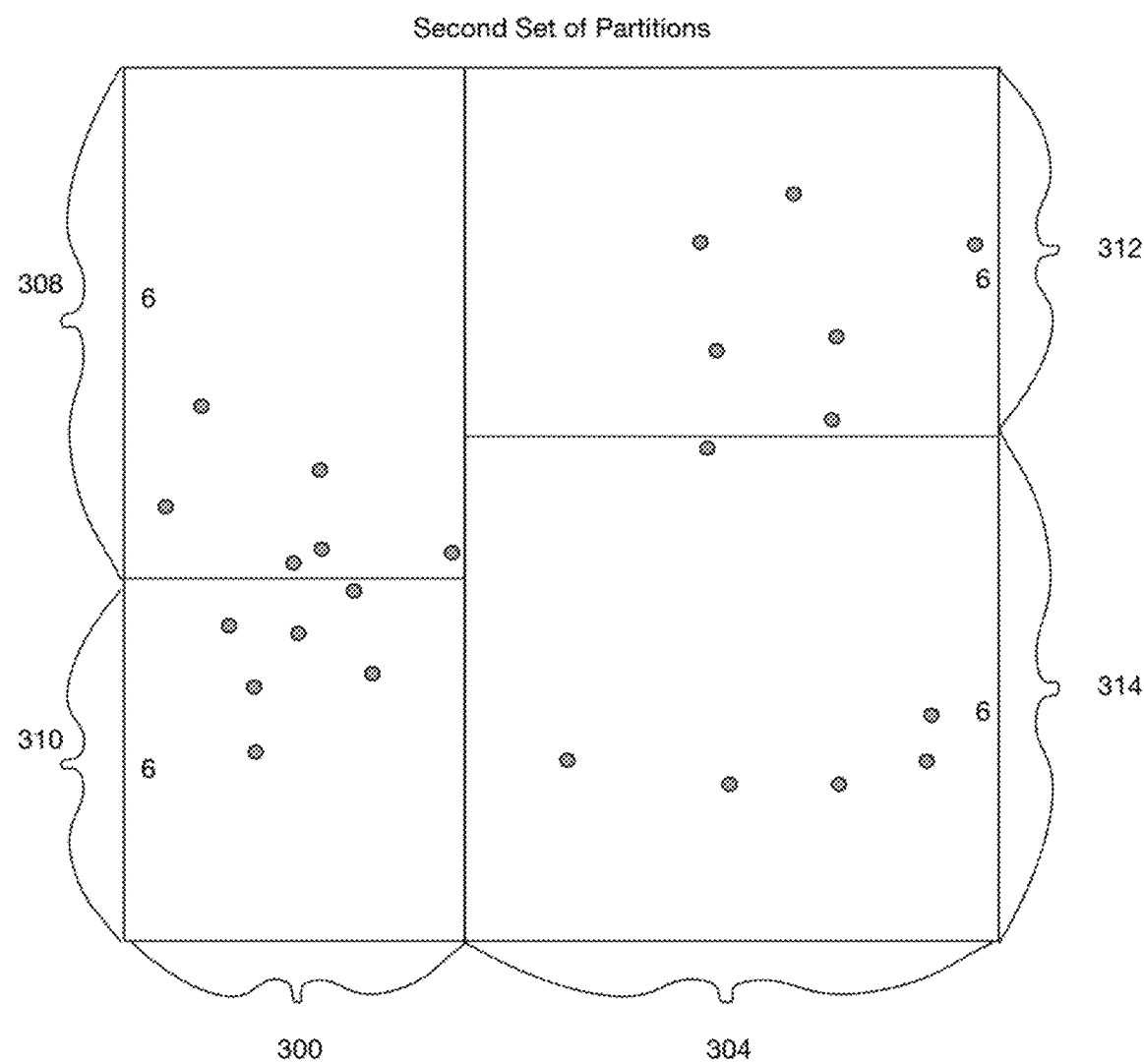
FIG. 3B is a diagram which illustrates a second partitioning used for creating a plurality of data clusters.

Now referring to FIG. 3b, there is shown an example in which each data cluster comprising twelve (12) data points generated according to step 602 is further divided into two different data clusters.

The first data cluster having a width 300 is divided into two data sub-clusters.

A first data sub-cluster of the first data cluster has a height 308 while a second data sub-cluster of the first data cluster has a height 310. Each of the first data sub-cluster and the second data sub-cluster has six (6) data points.

It will be appreciated that the height of each of the first data sub-cluster of the first data cluster and the second data sub-cluster of the first data cluster is determined by computing a median value of the data points located in the first data cluster.

The second data cluster having a width of 304 is also divided into two data sub-clusters.

A first data sub-cluster of the second data cluster has a height 312 while a second data sub-cluster of the second data cluster has a height 314.

It will be appreciated that the height of each of the first data sub-cluster of the second data cluster and the second data sub-cluster of the second data cluster is determined by computing a median value of the data points located in the second data cluster.

Each of the first data sub-cluster and the second data sub-cluster of the second data cluster has six (6) data points.

In accordance with processing step 608, a test is performed in order to find out if the at least one criterion is met.

In one embodiment, the at least one criterion comprises data cluster cardinality. More precisely, the test comprises determining if the current data cluster cardinality matches the intended cardinality. The current data cluster cardinality refers to a number of data points currently present in a given data cluster.

In the case where the at least one criterion is met, the partitioning is completed and an indication of the plurality of data clusters is provided in accordance with processing step 610.

In the case where the at least one criterion is not met and according to processing step 602, a further partitioning according to an axis is performed.

It will be appreciated that the axis used is alternated at each iteration.

Figure 3C:
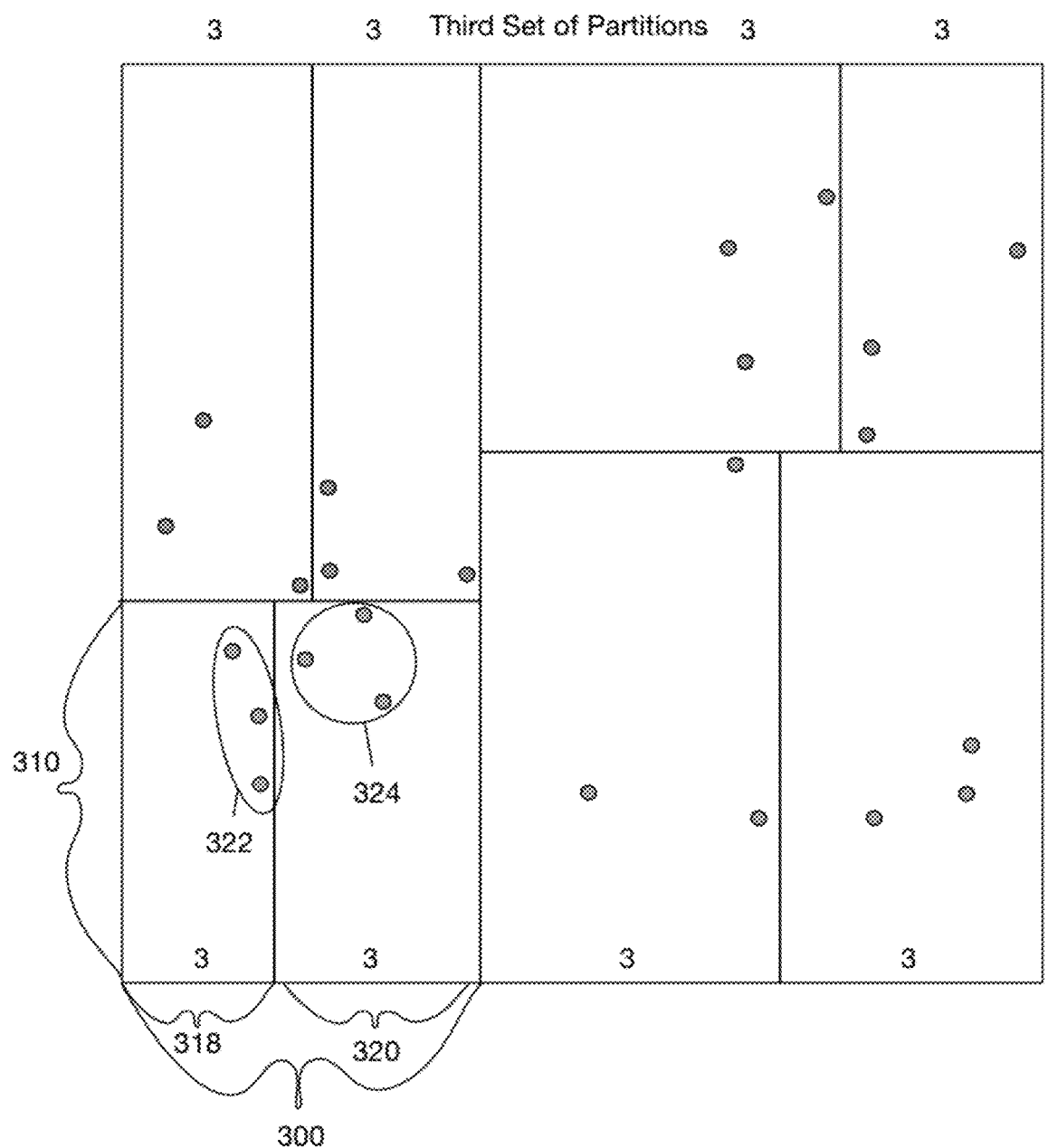
FIG. 3C is a diagram which illustrates a third partitioning used for creating a plurality of data clusters.

Now referring to FIG. 3c, there is shown an example in which each data sub-cluster shown in FIG. 3b is further divided in two.

For instance, the first data sub-cluster of the first data cluster is divided into a first data cluster comprising a group 322 of three (3) data points and a second data cluster comprising a group 324 of three (3) data points.

The skilled addressee will appreciate that, in the embodiment shown in FIG. 3c, the plurality of data points is divided into eight (8) data clusters wherein each data cluster comprises three (3) data points respectively. The skilled addressee will appreciate that the data cluster cardinality is therefore three (3) in this embodiment.

It will be appreciated that the result of this processing step is a plurality of irregularly sized rectangles that are smaller in dense data regions and bigger in sparse data regions.

Figure 4:
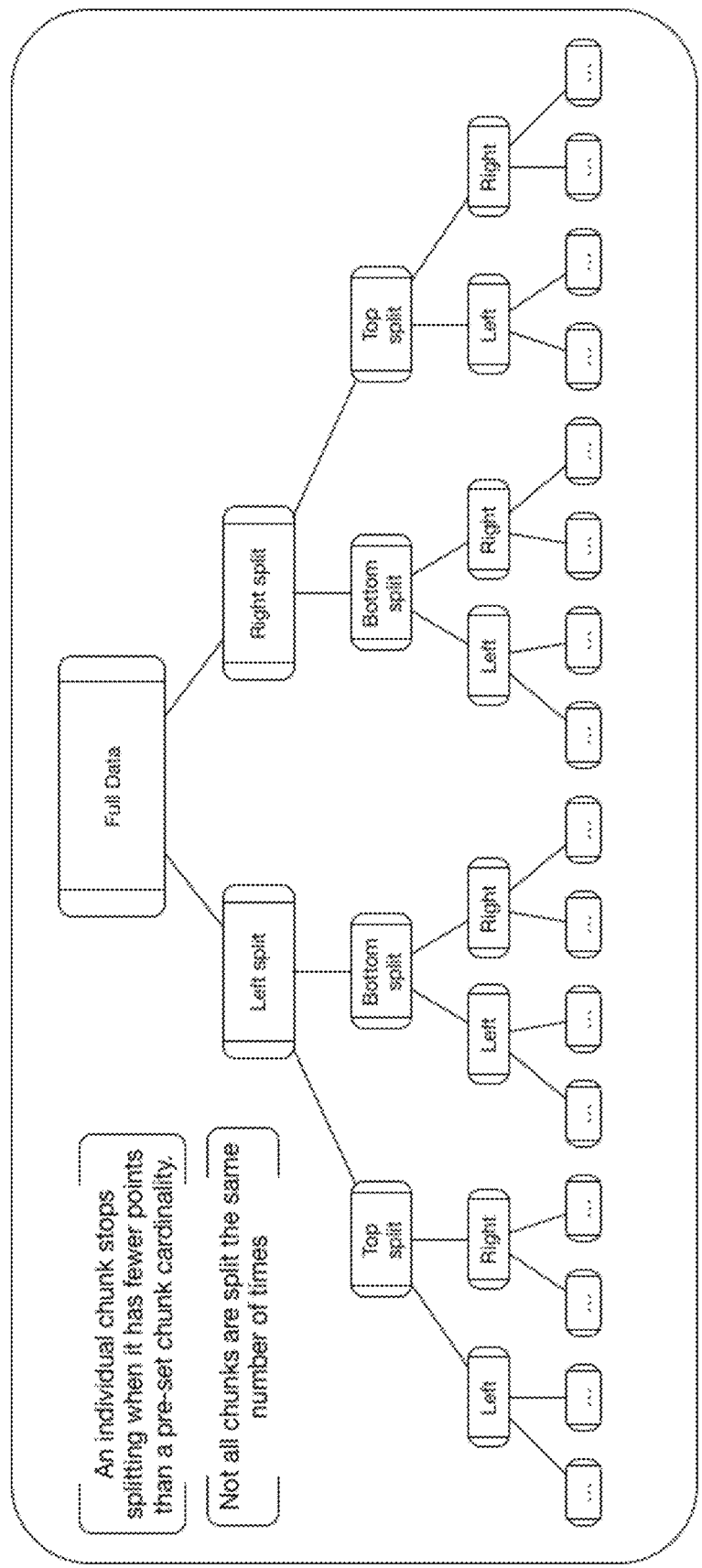
FIG. 4 is a diagram which shows how the generating of a plurality of data clusters is performed in accordance with one embodiment.

Now referring to FIG. 4, there is shown how the plurality of data clusters is generated in the case where the dimension of the data points is equal to two (2).

Now referring back to FIG. 1 and according to processing step 106, a set of representative data points is determined for each data cluster of the at least one data cluster.

It will be appreciated that the purpose of determining a set of representative data points for each data cluster is to further reduce the number of data points to display.

It will be appreciated that a representative data point is intended to represent a region in the x-y plane instead of a single data point, which encompasses several data points that are close to each other. Thus, a representative data point in turn ends up representing a set of closely placed data points.

It will be appreciated that the closeness of the data points is defined by a parameter called nearness index.

It will be appreciated by the skilled addressee that the larger the value of the nearness index is, the bigger the representative region or zone would be, more data points would be covered by it, and thus the reduction in the data points from the original data point cloud to the representative data point cloud will be large, and vice versa. So depending on the application problem at hand and the level of abstraction needed, an appropriate value of nearness index may be required.

It will be appreciated that the task of finding a minimum number of representative data points in a data point cloud such that all the other data points lie within the nearness index distance of at-least one of these representative points is an NP-hard problem.

It will be appreciated that the determining of a minimum number of representative data points in a data point cloud such that all the other data points lie within the nearness index distance of at least one of these representative data points may be performed according to various embodiments.

Figure 7:
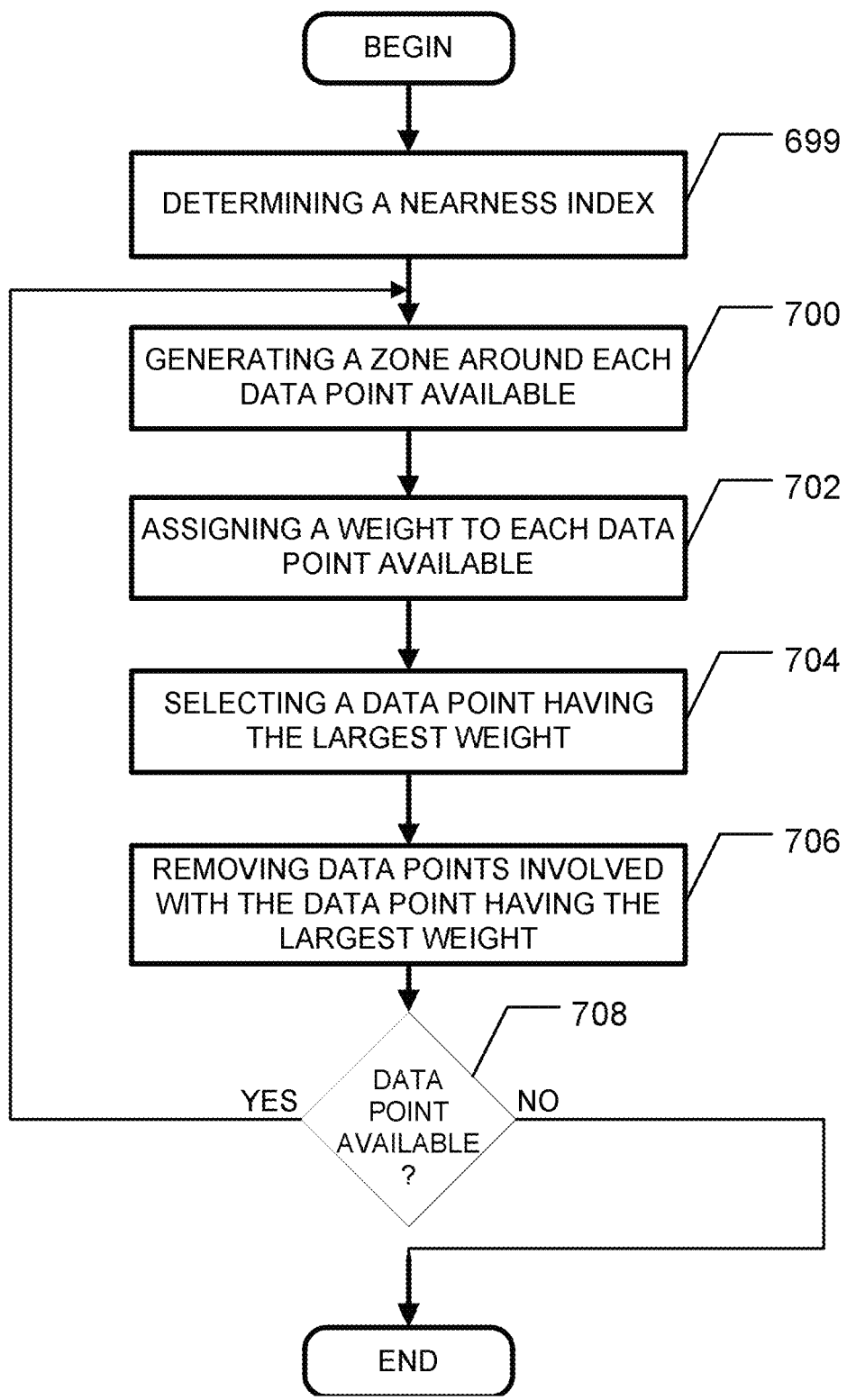
FIG. 7 is a flowchart which shows a first embodiment of a method for generating representative data points for a given data cluster.

A first embodiment of a method for finding a set of representative data points in a given data cluster is shown in FIG. 7.

Now referring to FIG. 7 and according to processing step 699, a nearness index is determined. It will be appreciated that the nearness index is used for determining a zone size. It will be appreciated that the nearness index may be computed using intrinsic information from data and/or extrinsic information from the analysis requirement.

Still referring to FIG. 7 and according to processing step 700, a zone is generated around each data point available in the given data cluster. It will be appreciated that the size of the zone is defined using the nearness index.

In one embodiment, each available data point is circled or sphered depending on the fact that the dimension is two (2) or three (3). In such embodiment, the radius of the circle or the sphere is equal to the nearness index around the data point as the center.

Figure 5A:
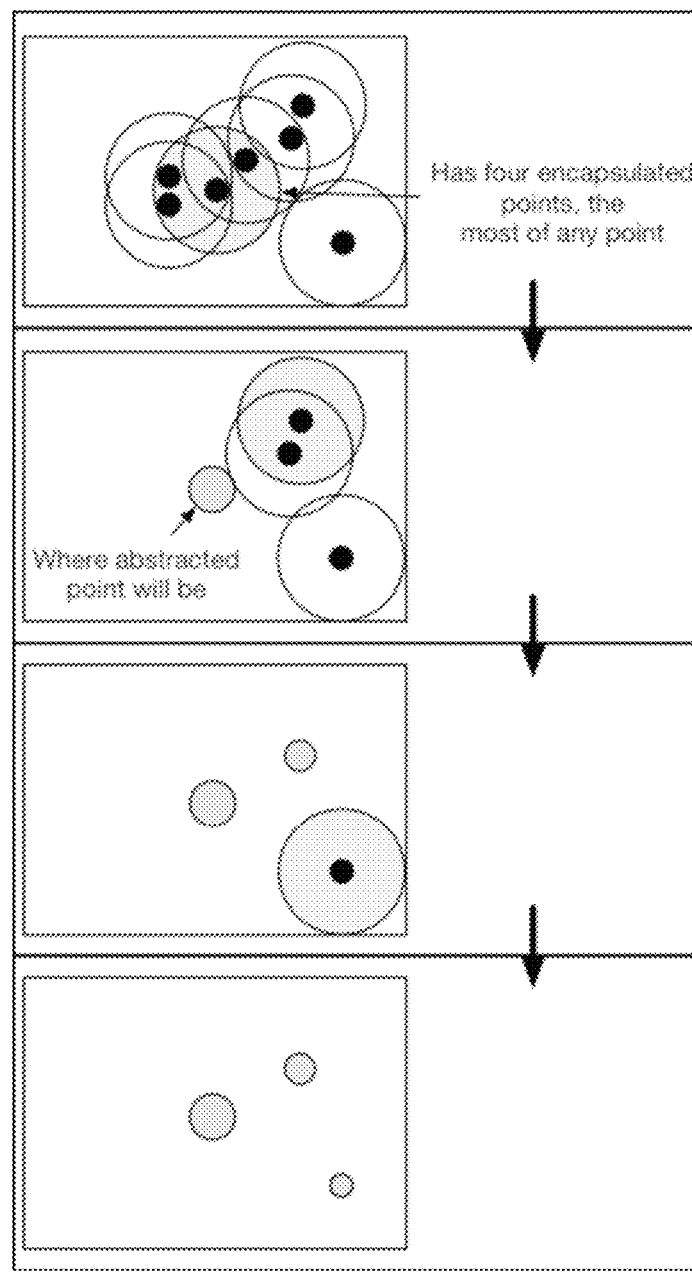
FIG. 5A is a diagram which illustrates an example showing how representative data points are generated for a given data cluster in accordance with a first embodiment.

Now referring to FIG. 5A, there is shown how a data point is circled.

Now referring to FIG. 7 and according to processing step 702, a weight is assigned to each data point available of the given data cluster.

In one embodiment, each data point is labelled with the weighted sum of the data points located inside its zone.

Still referring to FIG. 7 and according to processing step 704, the data point having the largest assigned weight is selected.

It will be appreciated that in one embodiment, if two or more data points have the same weight, the decision to select a data point amongst those is taken randomly.

Still referring to FIG. 7 and according to processing step 706, the data points within the zone of the selected data point having the largest weight are removed. It will be appreciated that the selected data point is also removed.

It will be appreciated that the coordinates of the selected data point are updated by the weighted mean of the same to determine the coordinates of a representative data point.

It will be appreciated that the representative data point is not available in future computations.

Still referring to FIG. 7 and accordingly to processing step 708, a test is performed in order to find out if at least one other data point is available in the data cluster.

In the case where no other data point is available, the process for determining the representative data points is completed.

In the case where at least one other data point is available, a zone around each data point of the at least one other data point available is generated in accordance with processing step 700.

It will be appreciated that, in one embodiment, every representative data point is stored in a database, not shown, located in the memory unit 210 with a list of all of its constituent data points.

Accordingly, it will be appreciated that the method for determining a set of representative data points for each data cluster, comprises for each given data cluster: until no data point is available in the given data cluster: generating a zone around each data point in the given data cluster, wherein the size of the generated zone is defined using a nearness index; assigning a weight to each data point in the given data cluster, wherein the assigned weight is representative of a number of data points located in the corresponding zone of each data point; selecting a data point having a largest weight assigned; updating the coordinates of the selected data point having the largest weight assigned with a weighted mean of coordinates of data points located inside its corresponding zone to form a representative data point; and removing the representative data point, the selected data point and data points located in a corresponding zone of the selected data point having the largest weight assigned; and providing at least one corresponding representative data point for each data cluster.

Now referring back to FIG. 5A, there is shown how the representative data points are generated in accordance with a first embodiment. At the end of the process and as shown in FIG. 5A, 3 representative data points are created.

It will be appreciated that the method for finding at least one representative data point may be performed according to another embodiment.

Figure 5B:
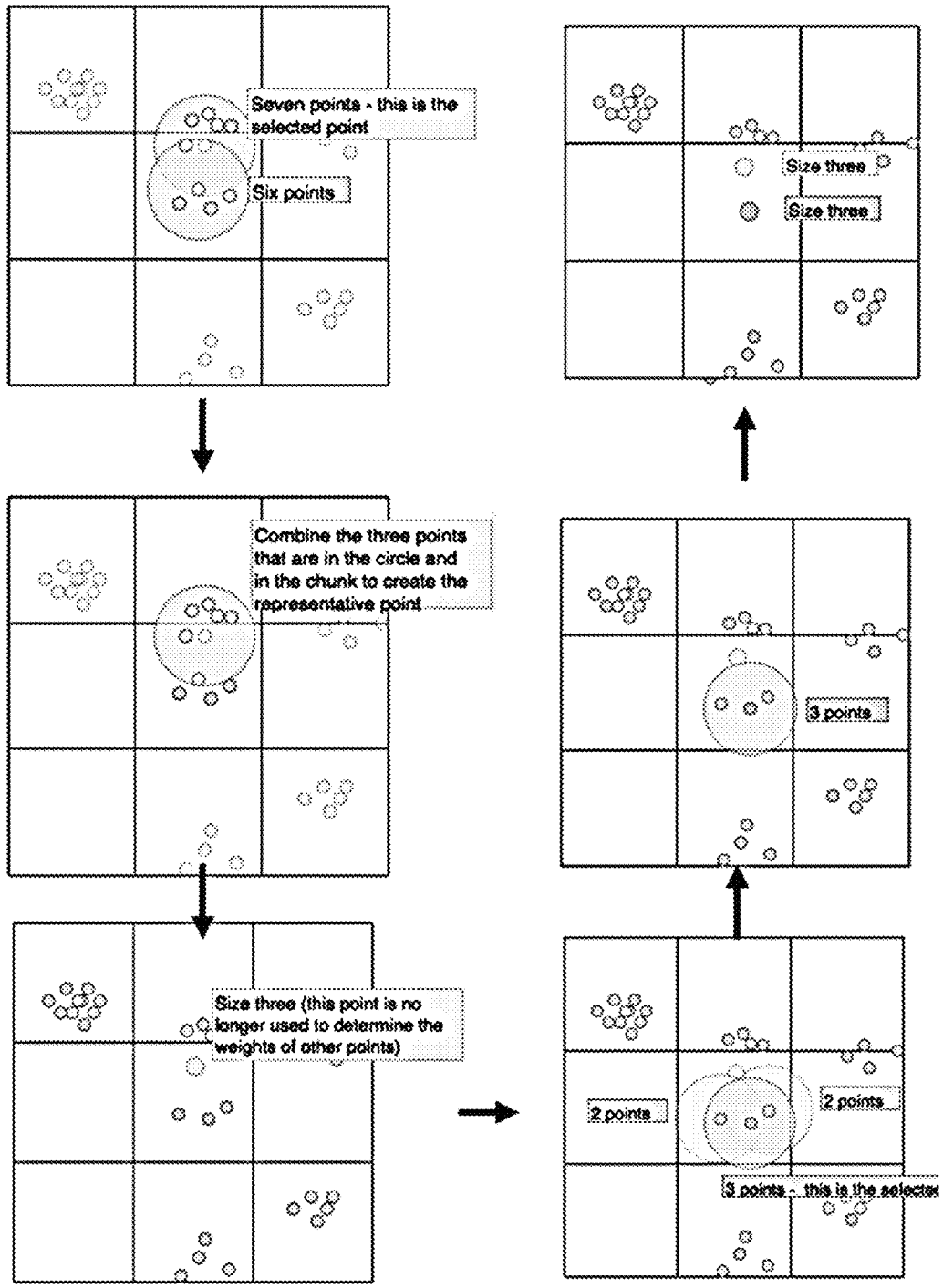
FIG. 5B is a diagram which illustrates an example showing how representative data points are generated for a given data cluster in accordance with a second embodiment.

Now referring to FIG. 5B, there is shown how the representative data points are generated in accordance with a second embodiment for a given data cluster.

While this was not the case in the first embodiment disclosed above, it will be appreciated that in this second embodiment illustrated in FIG. 5B, data points located outside the given data cluster but inside a given zone defined around a given data point are considered for computing a corresponding weight of the given data point. It will be appreciated that in this second embodiment, any point within the given zone associated with the selected data point will be removed once the weight is computed, except if it is located outside the data cluster associated with the given data point.

Figure 8:
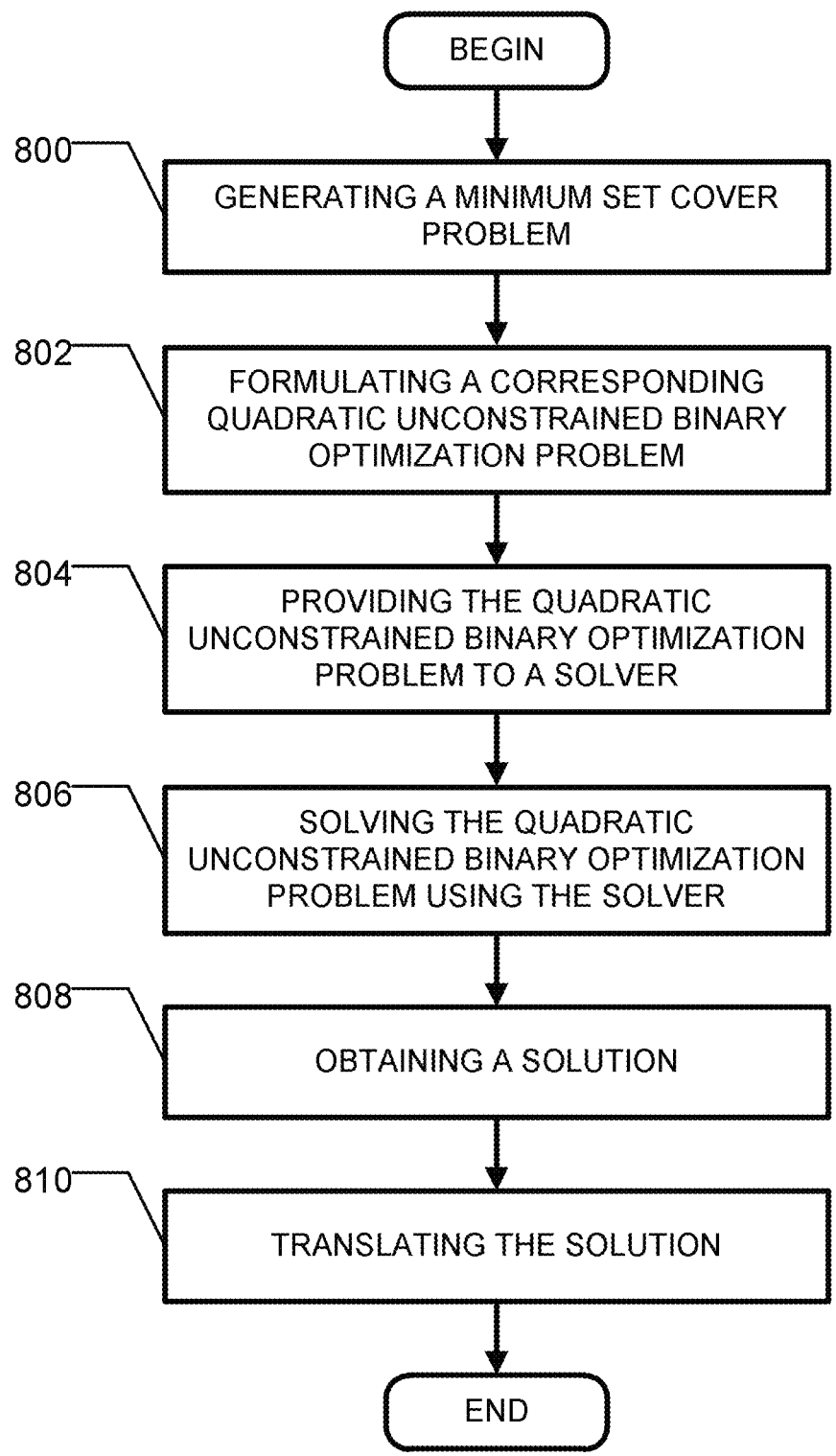
FIG. 8 is a flowchart which shows a third embodiment of a method for generating representative data points for a given data cluster.

Now referring to FIG. 8, there is shown a third embodiment for generating at least one representative data point for a given data cluster.

According to processing step 800, a minimum set cover problem is generated. It will be appreciated that here a set is defined as a collection of data points that are located within a zone centered around a candidate data point including the candidate data point itself. It will therefore be appreciated that the total number of sets is equal to the total number of data points in the data cluster being processed. The objective is to find a minimum number of sets that cover the collection of all the data points of the data cluster.

According to processing step 802, the minimum set cover problem is formulated as a quadratic unconstrained binary optimization polynomial.

According to processing step 804, the quadratic unconstrained binary optimization polynomial is provided to a solver. It will be appreciated that the solver may be one of a quantum oracle and a quadratic unconstrained binary optimization (QUBO) solver.

It will be appreciated that the quantum oracle may be of various types. In one embodiment, the quantum oracle is the D-Wave 2X System manufactured by D-Wave Systems Inc.

It will be appreciated that the quadratic unconstrained binary optimization solver may be of various types. In one embodiment, the quadratic unconstrained binary optimization solver is the Fujitsu digital annealer (see http://www.fujitsu.com/global/about/resources/news/press-releases/2017/0516-03.html).

It will be appreciated that the solver which is one of a quantum oracle and a quadratic unconstrained binary optimization solver may be operatively coupled to the digital computer 199 according to various embodiments. In one embodiment, the solver is operatively coupled with the digital computer 199 via a data network. It will be appreciated that the data network may be selected from a group consisting of local area network, metropolitan area network and wide area network. In one embodiment, the data network comprises the Internet.

According to processing step 806, the quadratic unconstrained binary optimization polynomial is solved by the solver which is one of the quantum oracle and the quadratic unconstrained binary optimization solver.

According to processing step 808, a solution is obtained from the solver by the digital computer 199. It will be appreciated that the solution obtained is a minimum set cover solution. It will be appreciated that each set in the minimum set cover solution is now treated as a circle and the data points present in the selected set cover solution are treated as the points falling within the boundary of the respective circle.

According to processing step 810, the solution is translated to provide at least one representative data point, each representative data point identified from the respective sets chosen by the solver which is one of a quantum oracle and a quadratic unconstrained binary optimization solver to appear in the minimum set cover solution.

It will be appreciated that that the method disclosed may be performed iteratively if for instance the user is not satisfied with a level of abstraction achieved. The method may be repeated again with a greater value of nearness index.

Now referring back to FIG. 1 and according to processing step 108, at least two sets of representative data points are combined in a user interface. It will be appreciated by the skilled addressee that this step may be optional. In fact, it will be appreciated that in the case where a single data cluster is generated no combining is performed since there is only one data cluster.

It will be appreciated that the purpose of this processing step is to provide the at least two sets of representative data points on a single user interface.

In another embodiment, all the sets of representative data points are combined in a user interface.

According to processing step 110, the user interface comprising the combined at least two sets of representative data points is displayed. It will be appreciated by the skilled addressee that processing steps 108 and 110 are an embodiment of a processing step of generating a user interface to be displayed to a user, the generated user interface comprising at least one set of representative data points.

It will be appreciated that the user interface may be displayed according to various embodiments.

In one embodiment, the user interface is displayed to a user on the display device 202.

It will be appreciated that the user interface may be displayed at a remote processing unit operatively coupled with the digital computer 199. In one embodiment, the remote processing unit is operatively coupled to the digital computer 199 using a data network. The data network may be selected from a group consisting of a local area network, a metropolitan area network and a wide area network. In one embodiment, the data network comprises the Internet.

It will be appreciated that in one embodiment, the displaying in a user interface of the at least one determined set of representative data points of the at least one corresponding generated data cluster comprises storing the at least one determined set of representative data points of the at least one corresponding generated data cluster.

Now referring back to FIG. 2, it will be appreciated that the application for displaying data representative of a large dataset 214 comprises instructions for receiving the dataset comprising a plurality of data points of dimension m.

The application for displaying data representative of a large dataset 214 further comprises instructions for reducing the dimension m of at least one data point of the plurality of data points to a dimension selected from a group consisting of two (2) and three (3) if the dimension of the least one data point is greater than or equal to 3.

The application for displaying data representative of a large dataset 214 further comprises instructions for generating at least one data cluster, each data cluster comprising a given number of data points.

The application for displaying data representative of a large dataset 214 further comprises instructions for determining a set of representative data points for each generated at least one data cluster, each representative data point for representing a region of the data cluster comprising a plurality of adjacent data points.

The application for displaying data representative of a large dataset 214 further comprises instructions for combining in a user interface at least two sets of representative data points from at least two corresponding data clusters if more than two data clusters are generated.

The application for displaying data representative of a large dataset 214 further comprises instructions for displaying the user interface on the display device, the user interface comprising the combined at least two sets of representative data points from at least two corresponding data clusters. It will be appreciated by the skilled addressee that in the case where there is only one data cluster generated, the user interface only comprises on set of representative data points for the data cluster.

Each of the central processing unit 200, the display device 202, the input devices 204, the communication ports 208 and the memory unit 210 is interconnected via the data bus 206.

It will be appreciated by the skilled addressee that the method disclosed may provide a level of abstraction for displaying data to a user.

It will be appreciated that the method may be applied iteratively. In such case, the processing steps of generating a plurality of data clusters, each data cluster comprising a given number of data points; the step of determining a set of representative data points for each data cluster, each representative data point for representing a region of the data cluster comprising a plurality of adjacent data points and the step of combining in a user interface at least two sets of representative data points from at least two corresponding data clusters are performed iteratively for a given number of iterations.

The given number of iterations may be determined depending on various factors. In fact, it will be appreciated that the iterations may be determined beforehand or not. In one embodiment, the number of iterations is not fixed and the abstraction process continues (iteratively) until the whole dataset is reduced from original number of points to just a single data point. It will be appreciated that the user can go back and forth between the different levels to analyze at any level of interest, depending on the need and analytical qualification of the level.

In one embodiment all intermediate data is stored such that a user may be able to navigate between the various abstraction levels (i.e. the various iterations).

It will be appreciated that a non-transitory computer-readable storage medium is further disclosed. The non-transitory computer-readable storage medium is used for storing computer-executable instructions which, when executed, cause a digital computer to perform a method for displaying data representative of a large dataset. The method comprises receiving the dataset comprising a plurality of data points of dimension m. The method further comprises reducing the dimension m of at least one data point of the plurality of data points to a dimension selected from a group consisting of two (2) and three (3) if the dimension m of the at least one data point is greater than or equal to three (3). The method further comprises generating at least one data cluster, each data cluster comprising a given number of data points. The method further comprises determining a set of representative data points for each data cluster, each representative data point for representing a region of the data cluster comprising a plurality of adjacent data points. The method further comprises displaying the user interface comprising at least one representative data points of at least one of the generated data cluster.

As mentioned above, a given processing unit may be used for processing a corresponding given data cluster. Accordingly, there is disclosed a digital computer for displaying data representative of a large dataset, the digital computer comprising more than one central processing unit; a display device; a communication port; a memory unit comprising an application for displaying data representative of a large dataset, the application comprising instructions for receiving the dataset comprising a plurality of data points of dimension m; instructions for reducing the dimension m of at least one data point of the plurality of data points to a dimension selected from a group consisting of two (2) and three (3) if the dimension m of the at least one data point is greater than or equal to three (3); instructions for generating more than one data cluster, each data cluster comprising a given number of data points; instructions for determining a set of representative data points for each generated more than one data cluster, each representative data point of a given set for representing a region of a corresponding given data cluster comprising a plurality of adjacent data points; wherein the generating is performed for each given data cluster by a corresponding given central processing unit and instructions for displaying in a user interface the determined at least one set of representative data points of the at least one corresponding generated data cluster; and a data bus for interconnecting the central processing unit, the display device, the communication port and the memory unit.

In fact, it will be appreciated that the method disclosed herein is of great advantage. In fact, a first advantage of the method disclosed herein is that it enables a user to have access to a limited amount of data by reducing the data size to a level at which the data can be clearly viewed and analyzed by the user.

Another advantage of the method disclosed herein is that the method may further help a user to readily recognize and understand patterns of data that can often be hidden due to the amount of data provided.

Another advantage of the method disclosed herein is that it may be implemented using parallel processing.

Another advantage of the method disclosed herein is that it may be implemented using a plurality of processors that do not have the capacity to work on very big datasets since the initial dataset may be divided into a plurality of data clusters and each data cluster is handled by a single of these processors.

Another advantage of the method disclosed is that it maintains the integrity of data to a considerable condensed level. That is, the coarsening provided by the method disclosed herein maintains the data distribution such that the clustering on the original dataset vs on the coarsened dataset gives comparable results (that is, very little loss of information).

Although the above description relates to a specific preferred embodiment as presently contemplated by the inventor, it will be understood that the invention in its broad aspect includes functional equivalents of the elements described herein.

The invention claimed is:

1. A computer-implemented method of displaying data representative of a large dataset, the method comprising:
   use of a processing device for:
      receiving the dataset comprising a plurality of data points of dimension m;
      reducing the dimension m of at least one data point of the plurality of data points to a dimension selected from a group consisting of two and three if the dimension of the least one data point is greater than or equal to three;
      generating at least one data cluster, each data cluster comprising a given number of data points;
      creating a set of representative data points for each generated at least one data cluster by, for each generated cluster:

removing at least a first set of a plurality of adjacent data points from the cluster, removing at least a second set of a plurality of adjacent data points from the cluster, for each removed set of plurality of adjacent data points, generate a representative data point for representing the corresponding set of plurality of removed adjacent data points, wherein each representative data point has coordinates that are a weighted mean of coordinates of the plurality of removed adjacent data points in the corresponding set of plurality of removed adjacent points represented by the representative data point; and displaying in a user interface the set of representative data points created for each of the at least one corresponding generated data cluster.

2. The computer-implemented method as claimed in claim 1, wherein the dataset is received from a remote processing unit operatively coupled to the processing device.

3. The computer-implemented method as claimed in claim 1, wherein the dataset is received from a memory located in the processing device.

4. The computer-implemented method as claimed in claim 1, wherein the dataset is a dataset of n images, wherein each image is represented by a vector having the dimension m, wherein each pixel is represented by a given coordinate of the vector.

5. The computer-implemented method as claimed in claim 1, wherein the dataset is a dataset representative of words.

6. The computer-implemented method as claimed in claim 1, wherein the reducing of the dimension m of at least one data point of the plurality of data points to a dimension selected from a group consisting of two and three is performed using a technique selected from a group consisting of t-distributed stochastic neighbor embedding (t-SNE), Principal component analysis (PCA), Sammon mapping and Isomap.

7. The computer-implemented method as claimed in claim 1, wherein more than one data cluster is generated; further comprising combining in the user interface at least two sets of representative data points from at least two corresponding data clusters; and wherein the displaying in the user interface of the at least one set of representative data point of at least one corresponding data cluster comprises displaying the user interface comprising the combined at least two sets of representative data points from at least two corresponding data clusters.

8. The computer-implemented method as claimed in claim 7, wherein the creating of a set of representative data points for each generated at least one data cluster is performed using a dedicated processing unit.

9. The computer-implemented method as claimed in claim 7, wherein each set of representative data points of each data cluster is combined in the user interface.

10. The computer-implemented method as claimed in claim 7, wherein each data point is characterized by coordinates in the dimension selected, wherein the generating of a plurality of data clusters, each data cluster comprising a given number of data points comprises dividing a space comprising the plurality of data points into two data clusters using a first axis characterized by a coordinate in a first direction, wherein the dividing comprises computing a median value of the coordinates of the plurality of data points in the first direction and wherein the coordinate in the first direction of the first axis is equal to the computed median value; and partitioning iteratively each data cluster into two partitions, wherein the partitioning of a given data cluster comprising a given number of data points having corresponding given coordinates is performed using a corresponding given axis having a corresponding given coordinate in a corresponding given direction, wherein the partitioning of the given data cluster comprises computing a corresponding median value of the corresponding given coordinates of the data points located in the given data cluster in the corresponding given direction and wherein the coordinate in the corresponding given direction of the given axis is equal to the computed corresponding median value, further wherein the corresponding given direction is alternating between a number of directions equal to the reduced dimension to thereby provide the plurality of generated data clusters.

11. The computer-implemented method as claimed in claim 10, wherein the partitioning is performed iteratively until a criterion is met.

12. The computer-implemented method as claimed in claim 11, wherein the criterion comprises a number of data points located in each of the plurality of generated data clusters.

13. The computer-implemented method as claimed in claim 1, wherein the creating of a set of representative data points for each generated at least one data cluster, comprises:

for each generated data cluster:

until no data point is available in the given data cluster:

generating a zone around each data point in the cluster, wherein the size of the generated zone is defined using a nearness index;

assigning a weight to each data point in the cluster, wherein the assigned weight is representative of a number of data points located in the corresponding zone of each data point;

selecting a data point having a largest weight assigned;

calculating representative coordinates for the representative data point that represents the number of data points located in the zone corresponding to the selected data point by updating the coordinates of the selected data point having the largest weight assigned with a weighted mean of coordinates of data points located inside its corresponding zone; and removing each data point located in a corresponding zone of the selected data point having the largest weight assigned; and for each data cluster, providing each of the corresponding at least one representative data point.

14. The computer-implemented method as claimed in claim 13, wherein the assigning of the weight to each data point is representative of a number of data points located in the corresponding zone of each data point in the given data cluster.

15. The computer-implemented method as claimed in claim 1, wherein the creating of a set of representative data points for each generated at least one data cluster, comprises:

for each given data cluster:

generating a zone around each data point of the given data cluster, wherein the size of the generated zone is defined using a nearness index;

generating a minimum set cover problem, wherein a set is defined as a collection of data points of the given data cluster that are located in a corresponding zone of a candidate data point;

formulating the minimum set cover problem as a quadratic unconstrained binary optimization polynomial;
providing the quadratic unconstrained binary optimization polynomial to a solver;
obtaining a minimum set cover solution from the solver;
translating the obtained minimum set cover solution to provide at least one representative data point for the given data cluster.

16. The computer-implemented method as claimed in claim 15, wherein the solver is one of a quantum oracle and a quadratic unconstrained binary optimization solver.

17. The computer-implemented method as claimed in claim 1, wherein the displaying in a user interface of the set of representative data points created for each of the at least one corresponding generated data cluster comprises storing the set of representative data points created for each of the at least one corresponding generated data cluster.

18. The computer-implemented method as claimed in claim 1, wherein the displaying in a user interface of the set of representative data points created for each of the at least one corresponding generated data cluster comprises transmitting the set of representative data points created for each of the at least one corresponding generated data cluster to a remote processing unit operatively connected with the processing device and further wherein the displaying is performed on the remote processing unit.

19. A digital computer for displaying data representative of a large dataset, the digital computer comprising:
a central processing unit;
a display device;
a communication port;
a memory unit comprising an application for displaying data representative of a large dataset, the application comprising:
instructions for receiving the dataset comprising a plurality of data points of dimension m;
instructions for reducing the dimension m of at least one data point of the plurality of data points to a dimension selected from a group consisting of two and three if the dimension m of the at least one data point is greater than or equal to three;
instructions for generating at least one data cluster, each data cluster comprising a given number of data points;
instructions for creating a set of representative data points for each generated at least one data cluster by, for each generated cluster:
removing at least a first set of a plurality of adjacent data points from the cluster,
removing at least a second set of a plurality of adjacent data points from the cluster,
for each removed set of plurality of adjacent data points, generate a representative data point for representing the corresponding set of plurality of removed adjacent data points, wherein each representative data point has coordinates which are a weighted mean of coordinates of the plurality of removed adjacent data points in the corresponding set of plurality of removed adjacent points represented by the representative data point; and
instructions for displaying in a user interface the set of representative data points created for each of the at least one corresponding generated data cluster; and
a data bus for interconnecting the central processing unit, the display device, the communication port and the memory unit.

20. A digital computer for displaying data representative of a large dataset, the digital computer comprising:
more than one central processing unit;
a display device;
a communication port;
a memory unit comprising an application for displaying data representative of a large dataset, the application comprising:
instructions for receiving the dataset comprising a plurality of data points of dimension m;
instructions for reducing the dimension m of at least one data point of the plurality of data points to a dimension selected from a group consisting of two and three if the dimension m of the at least one data point is greater than or equal to three;
instructions for generating more than one data cluster, each data cluster comprising a given number of data points;
instructions for creating a set of representative data points for each generated more than one data cluster by, for each generated cluster:
removing at least a first set of a plurality of adjacent data points from the cluster,
removing at least a second set of a plurality of adjacent data points from the cluster,
for each removed set of plurality of adjacent data points, generate a representative data point for representing the corresponding set of plurality of removed adjacent data points, wherein each representative data point has coordinates which are a weighted mean of coordinates of the plurality of adjacent data points in the corresponding set of plurality of removed adjacent points represented by the representative data point; wherein the generating is performed for each given data cluster by a corresponding given central processing unit; and
instructions for displaying in a user interface the set of representative data points created for each of the at least one corresponding generated data cluster; and
a data bus for interconnecting the central processing unit, the display device, the communication port and the memory unit.

21. A non-transitory computer-readable storage medium for storing computer-executable instructions which, when executed, cause a digital computer to perform a method for displaying data representative of a large dataset, the method comprising:
receiving the dataset comprising a plurality of data points of dimension m;
reducing the dimension m of at least one data point of the plurality of data points to a dimension selected from a group consisting of two and three if the dimension m of the at least one data point is greater than or equal to three;
generating at least one data cluster, each data cluster comprising a given number of data points;
creating a set of representative data points for each generated at least one data cluster by, for each generated cluster:
removing at least a first set of a plurality of adjacent data points from the cluster,
removing at least a second set of a plurality of adjacent data points from the cluster, for each removed set of plurality of adjacent data points, generate a representative data point for representing the corresponding set of plurality of removed adjacent data points, wherein each representative data point has coordinates which are a weighted mean of coordinates of the plurality of adjacent data points in the corresponding set of plurality of removed adjacent points represented by the representative data point; and displaying in a user interface the representative data points created for each of the at least one corresponding generated data cluster.

22. A computer-implemented method of displaying data representative of a large dataset, the method comprising: use of a processing device for:

receiving the dataset comprising a plurality of data points of dimension m;

reducing the dimension m of at least one data point of the plurality of data points to a dimension selected from a group consisting of two and three if the dimension of the least one data point is greater than or equal to three;

generating at least one data cluster, each data cluster comprising a given number of data points;

creating a set of representative data points for each generated at least one data cluster by, for each generated cluster:

removing at least a first set of a plurality of adjacent data points from the cluster, removing at least a second set of a plurality of adjacent data points from the cluster, for each removed set of plurality of adjacent data points, generate a representative data point for representing the corresponding set of plurality of removed adjacent data points, wherein each representative data point has coordinates which are a weighted mean of coordinates of the plurality of adjacent data points in the corresponding set of plurality of removed adjacent points represented by the representative data point; and generating a user interface to be displayed to a user, the user interface generated comprising the representative data points created for each of the at least one corresponding generated data cluster.

* * * * *